July 11, 1939.  R. E. STOLZ ET AL  2,165,519
REFRIGERATING CONTROL DEVICE
Filed Nov. 23, 1935  2 Sheets-Sheet 1
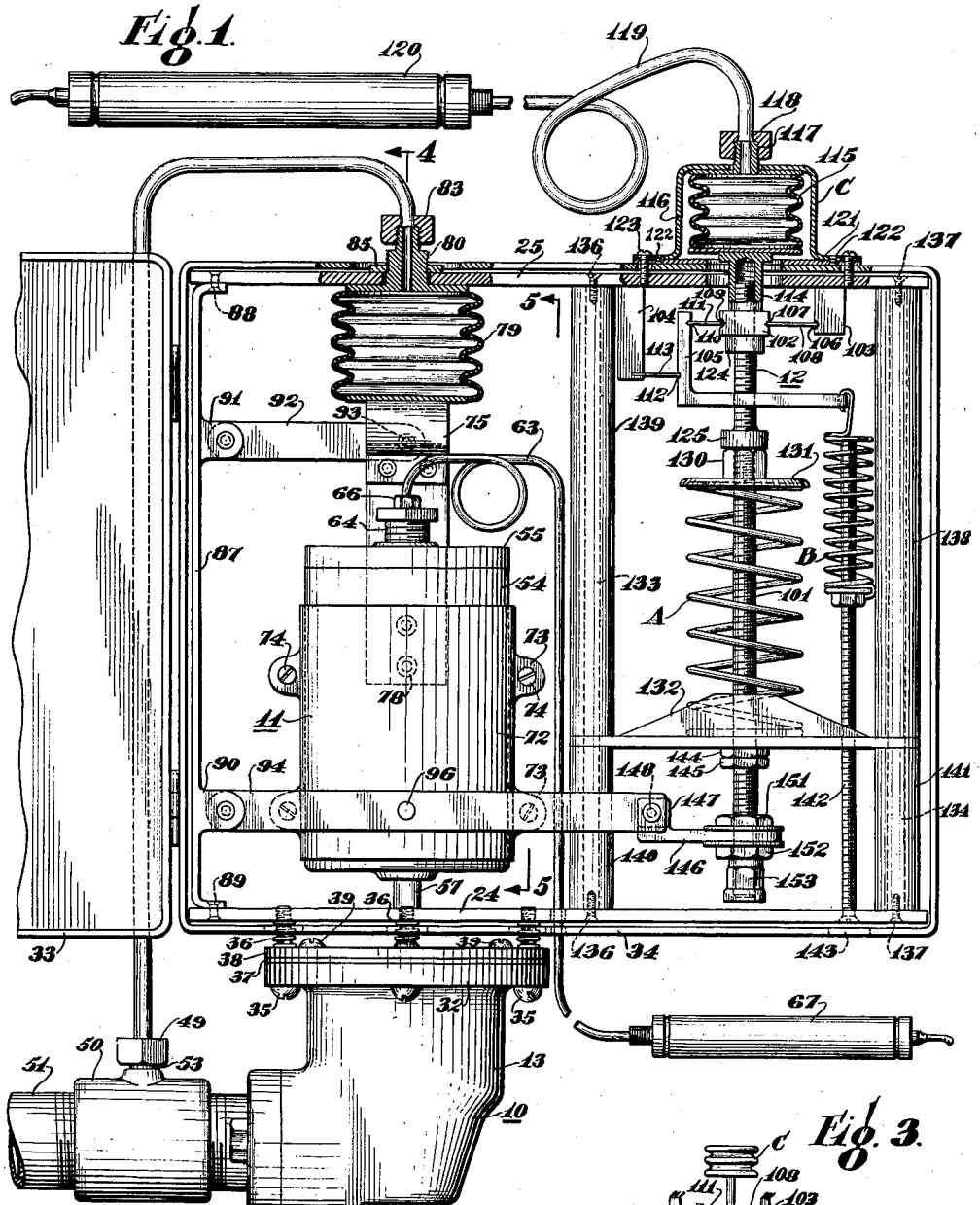
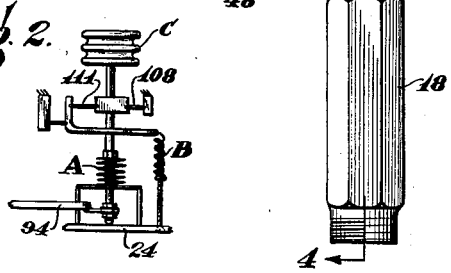
INVENTORS
Rufus E. Stolz
George V. Woodling

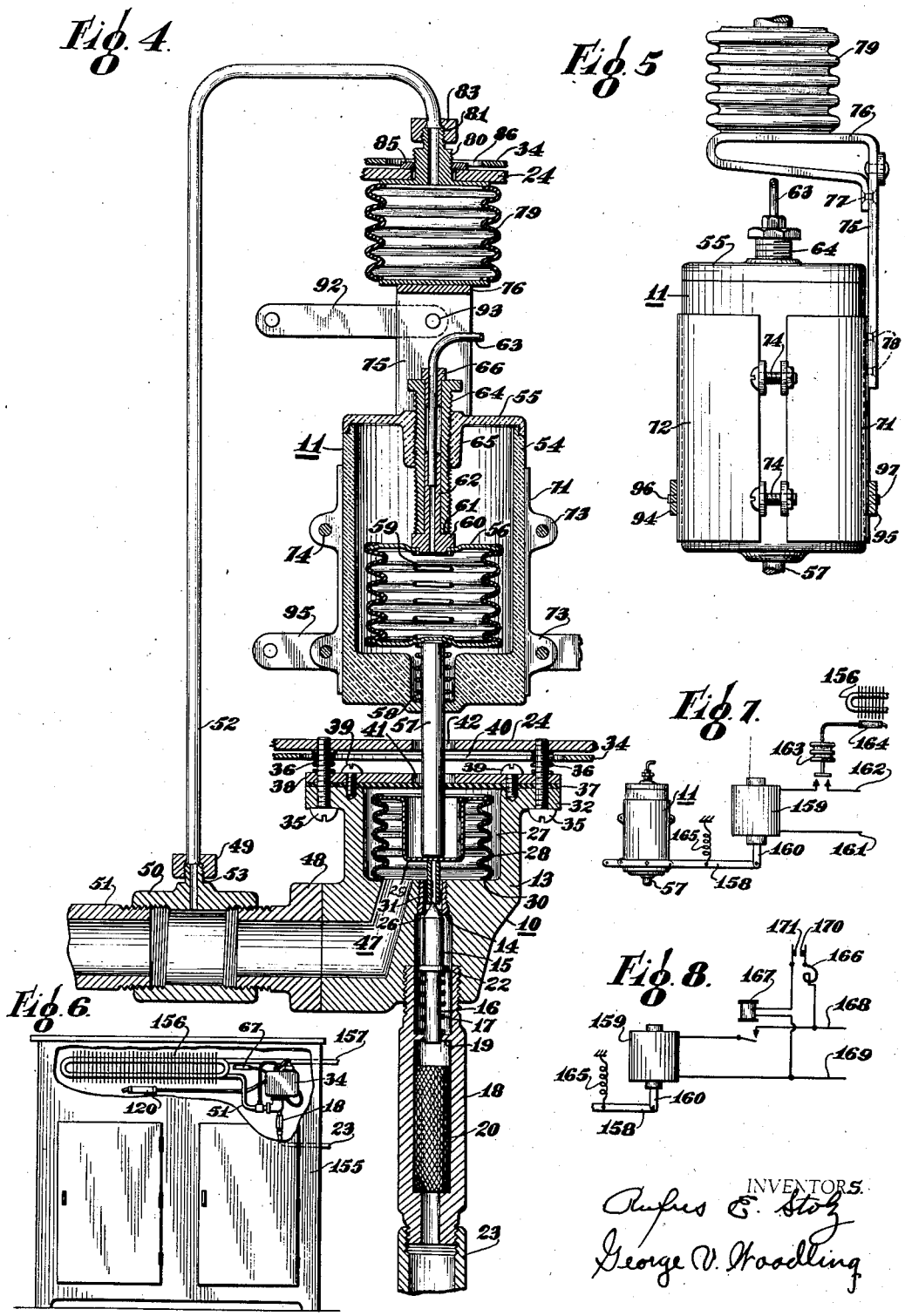

Patented July 11, 1939

2,165,519

UNITED STATES PATENT OFFICE 2,165,519

REFRIGERATING CONTROL DEVICE

Rufus E. Stolz, East Cleveland, and George V. Woodling, Lakewood, Ohio

Application November 23, 1935, Serial No. 51,294

14 Claims. (Cl. 62—3)

Our invention relates, in general, to control devices and more particularly to control devices adapted to be utilized in connection with a refrigerating system.

An object of our invention is the provision of a valve for controlling the flow of refrigerant to an evaporator of a refrigerating system.

A more specific object of our invention is the provision of a valve for controlling the flow of a refrigerant to the evaporator of a refrigerating system wherein the valve is governed in accordance with the temperature conditions resulting from the cooling action of the evaporator proper.

It is also an object of our invention to provide a valve for controlling the flow of a refrigerant to an evaporator of a refrigerating system wherein the valve may be adjustably set to regulate the pressure of the refrigerant entering the evaporator, and wherein the valve may be governed in response to the temperature of the suction side of the evaporator, and wherein the valve may also be governed in response to the temperature conditions resulting from the cooling action of the evaporator proper.

A further object of our invention is the provision of a valve partly enclosed by a flexible wall means and adapted to be influenced by an external actuating means which acts upon the flexible wall means.

It is also an object of our invention to provide for bodily shifting or moving the external actuating means with reference to the valve which is partly enclosed by a flexible wall means so that when the external actuating means is bodily moved away from the flexible wall means, the valve is free from interference from the external actuating means.

A still further object of our invention is to give a quick and snap action to the movement or shifting of the external actuating means.

A further object of our invention is the provision of a toggle arrangement having a kneeaction which gives a quick acting movement to the external actuating means as it is moved or shifted relative to the valve which controls the flow of the refrigerant to the evaporator of a refrigerating system.

Also another object of our invention is the provision of controlling the shifting or moving of the external actuating means either by a quick acting toggle arrangement or by an electrical magnetic solenoid arrangement.

Another object of our invention is the provision of establishing opposing forces in response to the pressure of the refrigerant leaving the valve in order to make the shifting or moving of the external actuating means independent of the pressure of the refrigerant leaving the valve.

Another object of our invention is the provision of a thermally actuating snap toggle arrangement for controlling the shifting or moving of the externally actuating means.

It is also an object of our invention to prevent too much ice collecting upon the evaporator of a refrigerating system by controlling the expansion valve which governs the flow of the refrigerant to the evaporator in accordance with the temperature conditions resulting from the cooling action of the evaporator proper.

Other objects and a fuller understanding may be had by referring to the following description and claims taken in combination with the accompanying drawings, in which:

Figure 1 is a front elevational view partly in cross-sections of a controlling device embodying the features of our invention, Figure 2 is a diagrammatic illustration of the floating toggle arrangement, which is incorporated in the control device of our invention, Figure 3 is a fragmentary view of the toggle arrangement shown in Figure 2, but illustrates a different position of the parts than that positioned in Figure 2, Figure 4 is a cross-sectional view of our control device taken along the line 4—4 of Figure 1, Figure 5 is a view of our control device showing principally the side elevational view of the external actuating means taken along the line 5—5 of Figure 1, Figure 6 is a view of a refrigerator, part being cut away to illustrate the manner in which our control device is connected to the evaporator of the refrigerator, Figure 7 is a fragmentary and diagrammatic illustration of a modified form of shifting or moving the external actuating means by a solenoid controlled by thermally actuated switch response to the temperature conditions resulting from the cooling action of the evaporator proper, and Figure 8 is a diagrammatic modified showing of the arrangement shown in Figure 7 wherein the solenoid is controlled by a relay which is energized through a thermostat that is located within the cooled chamber of the refrigerating system.

With reference to Figures 1, 4, and 5, our control device comprises essentially three main cooperatively associated parts; namely, the expansion valve assembly indicated generally by the reference character 10, the external actuating means indicated generally by the reference character 11, and the quick acting floating toggle arrangement indicated generally by the reference character 12. These three essential and major parts may be connected to and carried by a lower assembly plate 24 and an upper assembly plate 25 which may be mounted within a suitable box 34 having a lid 33.

The expansion valve assembly 10 is constructed very much in line with the usual valve assembly in the conventional expansion valve for controlling the flow of the refrigerant to an evaporator of a refrigerating system. As illustrated, the expansion valve assembly comprises a valve housing 13, having an expansion valve 26 mounted therein which expansion valve consists of a threadably replaceable valve seat 14 and a valve stem 15 adapted to move relative to the replaceable valve seat 14. The lower portion of the valve housing 13 is provided with a threaded opening to receive a valve stem thimble 18 having threads upon its upper end which screws into the threadable opening of the valve housing 13. The lower end of the valve stem thimble is provided with threads to engage the pipe 23 which receives liquid refrigerant from the compressing unit of the refrigerating system. Internally of the valve stem thimble 18, there is positioned a screen or cleaner 20 which prevents any sediment or other foreign particles from entering the valve to cause improper sealing thereof. The upper end of the valve stem thimble 18 is arranged to receive the valve stem shank 16 integrally formed with the valve stem 15. In order to resiliently urge the valve stem 15 against the replaceable valve seat 14, there is provided a valve spring 17 which is mounted between the spring shoulder 22 on the valve stem and the inwardly projecting lugs 19 mounted inside of the valve stem thimble 18. In this manner the valve stem 15 is resiliently urged against the replaceable valve seat 14 to close normally the valve which controls a flow of the refrigerant to the evaporator of a refrigerating system.

The upper portion of the expansion valve assembly 10 is provided with an enlarged recess 27 into which is mounted a flexible wall means 28 having its lower peripheral edge suitably connected such as at 30, to the bottom of the enlarged recess 27. As illustrated, the flexible wall means 28 is provided with a cup-shaped recess having substantially a flat bottom 29 and is disposed in spaced relation above the valve stem 15. Intermediate the bottom 29 and the valve stem 15 is an actuating pin 31 which is smaller than the opening in the valve seat 14 in order to allow the refrigerant to flow past the actuating pin. A plunger 57 carried by the external actuating means 11 is adapted to have its lower end engage the top and external side of the bottom 29 of the flexible wall means 28. As shown the lower assembly plate 24 is provided with an opening 42 in order to allow the plunger 57 to pass therethrough. By means of this construction of the plunger 57 and the expansion valve assembly, a downward movement of the plunger 57 constrains the valve stem 15 to move downwardly and allow the refrigerant to flow past the expansion valve 26 and into the flexible wall means 28 from which the refrigerant flows out through the opening 47 to the evaporator of a refrigerating system. As the refrigerant flows through the opening 47, it passes through a flanged attachment 49, a T-shaped coupling 50, and a pipe 51 to the evaporator of a refrigerating system.

As shown best in Figures 1 and 4, the upper portion of the valve housing 13 is provided with an external flange 32 adapted to be adjustably connected to the lower assembly plate 24 by means of the screws 35 and the adjustable springs 36.

The lower side of the box 34 above the valve housing 13 is provided with a large opening 40 so that the springs 36 may rest up against the lower assembly plate 24.

In order to prevent any moisture from contacting the flexible wall means 28, we make a substantially air tight seal around the plunger 57 at the place where it enters the expansion valve housing 13. To this end, we utilize a rubber gasket 37 which has a central opening through which the plunger 57 passes. This opening in the rubber gasket 37 tightly engages the plunger 57 so that no moisture may seep or otherwise pass along the plunger 57 through the opening. Also the rubber gasket 37 is flexible so that the plunger 57 is free to move up and down. Above the rubber gasket 37 is a plate 38 which may be connected to the expansion valve housing 13 by means of screws 39. The central portion of the plate 38 is provided with an opening 41 through which the plunger 57 may pass.

The external actuating means 11 comprises a hollow casing 54, which may be constructed of heat non-conducting material such as Bakelite, having a flexible wall means 56 mounted therein which is adapted to exert a downward pressure upon the plunger 57. The bottom of the hollow casing 54 is provided with a central depression in order to receive a spring 58. Also there is mounted within the flexible wall means 56 a second spring 59 which exerts a downward pressure upon the plunger 57. As shown, there is a small clearance between the bottom of the flexible wall means 56 and the bottom of the hollow casing 54. This clearance allows the flexible wall means to expand throughout this small distance for exercising a downward pressure upon the valve stem 15. Also the bottom of the hollow casing 54 constitutes a stop to limit the expansion travel of the flexible wall means 56. The top of the flexible wall means 56 is provided with an outlet fitting 60 which has a shoulder 61. This outlet fitting 60 may be attached to the top of the flexible wall means 56 in any suitable manner such as by soldering. Integrally attached to the outlet fitting 60 is an upright hollow projection 62 into which the end of the flexible tube 63 is attached by any suitable means such as soldering. The hollow casing 54 is provided with a threaded cover 55 which may be detachably and threadably connected to the upper peripheral edge of the hollow casing 54. The central portion of the threaded cover 55 is provided with a central flange 65 having internal threads to receive a threaded sleeve 64 having its lower end engaging the shoulder 61 of the outlet fitting 60. The turning of the threaded sleeve 64 varies the spring tension exerted upon the plunger 57. As illustrated, the threaded sleeve is provided with a plug 66 at its upper end in order to guide and protect the flexible tube 63 at the place where it leaves the threaded sleeve 64. The flexible tube 63 is connected to a controlled bulb 67 which is adapted to be placed adjacent the suction side of the evaporator of the refrigerating system.

As shown in Figures 1, 4, and 5, the hollow casing 54 is carried within a split casing having two parts 71 and 72 which firmly engage the outside of the hollow casing when the screws 74, which extend through the ears 73, are tightly screwed in. The purpose of utilizing a split casing is to provide a construction so that the hollow casing 54 may be removed when necessary during servicing of our control device. Attached to the rear split part 71 by means of rivets 78 is an upright bracket 75 which extends above the hollow casing 54 for a suitable clearing distance and then is bent horizontally in a forwardly direction to make a flat top 76, after which the bracket is bent back rearwardly and suitably riveted to the upright portion by means of the rivets 77. Mounted between the horizontal top part 76 of the bracket and the upper assembly plate 25 is a flexible wall means 79. The central portion of the flexible wall means 79 is provided with an outlet fitting 80 having external threads to receive the nut 85 which firmly connects the flexible wall means 79 to the upper assembly plate 25. The top edge of the box 34 is provided with an opening 86 in order to allow the nut 85 to engage directly the upper assembly plate 25. The upper end of the outlet fitting 80 is provided with a reduced threaded extension in order to receive the connecting nut 83 for holding the tube 52 thereto. By means of this construction, the flexible wall means 79 is connected in communication with the T-shaped coupling 50. As illustrated, the lower end of the tube 52 is connected to the threaded extension 53 by means of the nut 49. Therefore, the pressure within the flexible wall means 79 is the same as the pressure of the refrigerant which enters the evaporator of the refrigerating system.

The external actuating means 11 is adapted to be moved up and down relative to the expansion valve assembly 10. To accomplish this, we utilize a pair of levers 94 and 95 adapted to pivotally engage the lower portion of the external actuating means 11 and a single lever 92 adapted to pivotally engage the upper portion of the external actuating means 11. The left-hand end of the levers are pivotally connected to an upright end plate 87 which has its lower end connected to the lower assembly plate 24 by means of the rivet 89 or other suitable means and which has its upper end connected to the upper assembly plate 25 by means of the rivets 88 or other suitable means. The upper portion of the upright end 87 is provided with an inwardly projecting ear member 91 to which the left-hand end of the single lever arm 92 may be pivotally connected. The right-hand end of the single lever arm 92 is pivotally connected to the upright bracket 75 by means of a suitable pivotal connection 93. The lower portion of the upright end plate 87 is provided with a set of ear members 90 spaced apart to which are pivotally attached the left-hand end of the pair of levers 94 and 95. The lower lever 94 intermediate its ends is arranged to pivotally engage a pinion 96 which is mounted to the split casing 72, and the lever 95 intermediate its end is adapted to engage a pinion 97 mounted to the split casing 71, see Figures 1 and 5. The right-hand end of the lower levers 94 and 95 are arranged to be actuated by the floating toggle assembly 12.

As illustrated best in Figure 1 the right-hand ends of the levers 94 and 95 are suitably pivoted by means of a cross-pin 148 to the upturned ears 147 of the actuating plate 146 which is adjustably connected to the longitudinal threaded stem 101 of the toggle assemble 12 by means of adjustable jam nuts 151 and 152. Therefore, the up and down movements of the floating toggle assembly 12 constrains the external actuating means 11 to be moved up and down relative to the expansion valve assembly 10. The floating toggle arrangement 12 is arranged to be variably influenced by the thermo-expansible fluid power device indicated generally by the reference character C, which is connected in communication with a thermo-expansible fluid tube 120 by means of a tubing 119. In actual practice, the thermo-expansible fluid tube 120 is provided with an expansible fluid and accordingly, the pressure exerted by the expansible fluid is a function of the temperature surrounding the expansible fluid tube 120. As will appear later in the description, this expansible fluid tube 120 may be placed adjacent to, or in the vicinity of, the evaporator of a refrigerating system so that the pressure exerted by the expansible fluid is a function of the temperature conditions resulting from the cooling action of the evaporator.

The thermo-expansible power device C, may be constructed of a bellows or flexible wall means 115 which is mounted within the housing 116 on top of the box 34. Interposed between the lower flange of the housing 116 and the top surface of the box 34 is a stop plate 121. This stop plate 121 is riveted to the lower flange of the housing 116 by means of the rivets 122. The lower flange of the housing 116 may be suitably connected to the upper assembly plate 25 by means of suitable screws 123. Therefore, the entire thermo-expansible fluid power device C may be disassembled from the upper assembly plate 25 by merely removing the screws 123. The purpose of the stop plate 121 is to keep the flexible wall means or bellows 115 from expanding when the housing 116 is removed from the upper assembly plate 25. The upper end of the flexible wall means or bellows 115 is provided with a threaded outlet 117 to which the tubing 119 is attached by means of a tightened nut 118, or by means of solder or both.

The floating toggle arrangement which is indicated generally by the reference character 12 comprises the longitudinal threaded stem 101, the floating block 102, the knife edged members 108, 111, and 113, the L-shaped lever 105, the large adjustment spring A, and the small adjustment spring B. The opposite longitudinal sides of the floating block member 102 are provided with suitable longitudinal notches 107 and 109. Spaced to the right of the floating block member 102 is a stationary block member 103 which is suitably connected to the upper assembly plate 25 and which is provided with a longitudinal notch 106 along the inner edge thereof. The knife edged member 108 is adapted to be positioned into the two longitudinal notches 106 and 107. The upper inside edge of the L-shaped lever 105 is provided with a longitudinal notch 110. The knife edged plate 111 is positioned between the longitudinal notches 109 and 110. Positioned to the left of the L-shaped lever 105 is a stationary block member 104 suitably connected to the upper assembly plate 25. The left hand end of the knife edged member 113 is suitably connected to the lower inside edge of the stationary block 104 and the right hand end of the knife edged member 113 is arranged to fit into a longitudinal notch 112 provided in the outer right hand edge surface of the L-shaped lever 105.

The upper end of the small adjustment spring B is connected to the right hand end of the L-shaped lever 105. The lower end of the small adjustment spring B is provided with a threaded nut through which an adjustment screw 142 is threadably engaged. The lower end of the adjustment screw 142 is provided with a screwdriver head and its rotatively mounted in the lower assembly plate 24. The lower surface of the box is provided with an opening 143 through which a screwdriver may be inserted for turning the adjustment screw 142, and thus vary the tension of the small adjustment spring B.

The large adjustment spring A surrounds the longitudinal threaded stem 101 and is constrained to act between a lower spring bracket 132 and an upper spring washer 131. The tension of the large adjustment spring A is varied by turning the adjusting nut 130. The upper limit through which the adjusting nut 130 may be turned is controlled by the stop portion 125. Any suitable means may be provided to rigidly support the lower spring bracket 132. To this end, we utilize two upright longitudinal rods 133 and 134 having their ends respectfully connected to the upper and lower assembly plates 24 and 25 by means of the screws 136 and 137. Inserted over the longitudinal rods 133 and 134 are a plurality of hollow tubes 138, 139, 140, and 141. The left hand end of the lower spring bracket 132 surrounds the longitudinal rod 133 and is positioned between the adjacent ends of the tubes 139 and 140, and the right hand end of the lower spring bracket 132 surrounds the longitudinal rod 134 and is positioned between the adjacent ends of the tubes 138 and 141. In this manner, the lower spring bracket 132 is rigidly held in place to form a firm bracket for the large adjustment spring A. The upper travel of the longitudinal threaded stem 101 is determined by the setting of the stop nut 144 which engages the lower edge surface of the spring bracket 132. A jam nut 145 is provided to keep the stop nut 144 from turning when once adjusted. The lower travel of the longitudinal threaded stem 101 is determined by the adjustment of the threaded lug 153 which strikes the inside surface of the lower assembly plate 24. The upper end of the longitudinal threaded stem 101 is provided with a threaded cap 114 having a flat head which engages the underneath surface of the flexible wall bellows 115. As illustrated, the lower end of the threaded cap 114 engages the upper surface of the floating block member 102. A jam nut 124 is adapted to engage the lower edge surface of the floating block member 102. Consequently, the floating block member 102 is firmly held in position.

It is noted that the toggle arrangement indicated generally by the reference character 12, is such that it is substantially free of friction, inasmuch as the movement is carried by the knife edged members 108 and 111. Thus, the entire toggle assembly may be referred to as the floating toggle arrangement. In the study of the toggle arrangement, reference may be had to the diagrammatic illustrations shown in Figures 2 and 3. It is noted that when the knee-action produced by the knife edged members 108 and 111 is substantially straight, there is substantially no urging force produced by the small adjusting spring B to move the threaded plunger 101. This position is illustrated in Figure 2. On the contrary, it is noted with reference to Figure 3 that when the knee-action produced by the knife edged members 108 and 111 is biased, there is an urging force produced by the small adjusting spring B to urge the plunger 101 downwardly. Therefore, when the knee-action produced by the knife edged members 108 and 111 is substantially straight, it is only necessary, when moving the plunger 101 downwardly, for the variable force produced by the thermo-expansible fluid power device C to be increased to such a value that it is slightly greater than the opposing force produced by the large adjusting spring A. This means that when the temperature surrounding the thermo-expansible fluid tube 120 obtains a certain value sufficient to cause the variable force created by the thermo-expansible fluid power device C, to be slightly greater than the opposing force set up by the large adjusting spring A, then the plunger 101 is urged downwardly which trips the toggle arrangement and actuates the external actuating means 11 downwardly with reference to the expansion valve assembly 10. This downward movement of the external actuating means 11 depresses the valve stem 15, except as otherwise modified by the internal bellows 56 and the internal springs 58 and 59. In other words, the downward movement of the external actuating means 11 modified the operation of the expansion valve assembly to control the flow of the refrigerant therethrough to the evaporator, which in turn reduces the temperature surrounding the expansible fluid tube 120. By this arrangement, the upper temperature setting, at which the refrigerant is delivered to the evaporator to produce a cooling action, is determined by the tension of the large adjusting spring A, which is effected by the turning of the adjusting nut 130.

With reference to Figure 3, it is noted that when once the plunger 101, is biased downwardly, then the force produced by the small adjusting spring B comes into play and helps to urge or snap the plunger 49 downwardly. This means that when the knee action produced by the knife edged members 108 and 111 are biased, the force produced by the small spring B opposes the upward force produced by the large adjusting spring A. Therefore, in order to close the expansion valve to shut off the refrigerant to the evaporator, it is necessary that the temperature influencing the thermo-expansible fluid tube 120 be reduced to such low value that the variable force produced by the thermo-expansible fluid power device C, plus the force of a small adjusting spring B, is less than the force produced by the large adjusting spring A. Accordingly, the lower temperature, at which the external actuating means 11 is lifted away from the expansion valve assembly, to close the expansion valve and stop the flow of the refrigerant to the evaporator, is much lower than the temperature at which the external actuating means is lowered with reference to the expansion valve assembly 10 to open the expansion valve and allow the refrigerant to flow to the evaporator for producing a cooling action. This means that the spread between the upper temperature bracket at which the expansion valve is opened, and the lower temperature bracket at which the expansion valve is closed, is determined by the tension of the small adjusting spring B. Thus, by the construction of our control device, it is possible to set the upper temperature at which the refrigerant is delivered to the evaporator and the lower temperature at which the refrigerant is shut off from the evaporator. The spread between the upper and lower temperature may be as little as 4 degrees. This is because the floating toggle assembly is substantially free of all friction.

In Figure 6, we illustrate how our control device may be connected to control the flow of the refrigerant to a "dry expansion" evaporator 156 which may be mounted within a suitable refrigerator 155. The refrigerant, as it comes from the compressor (not shown), flows through the pipe 23, the expansion valve assembly 10, the pipe 51 to the entrance side of the evaporator 156, and after flowing through the evaporator through the suction pipe 157 from which the refrigerant flows back to the compressor. As illustrated, the thermo-expansible tube 120 is placed adjacent to, and beneath, the fins of the evaporator 156. The control bulb 67 is placed adjacent to the suction line 157.

After our control device is assembled, the various cooperatively associated parts thereof are adjusted. For instance, the relative position between the external actuating means 11 and the expansion valve assembly 10 may be effected by adjusting the screws 35. Also this relative position between the external actuating means 11 and the expansion valve assembly 10 may be adjusted by moving the right hand end of the levers 94 and 95 with reference to the plunger 101 by adjusting the jam nuts 151 and 152.

The operation of our control device will be first explained under the assumption that the external actuating means 11 is in its lowermost position with reference to the expansion valve assembly 10. Under this assumption, the expansion valve 26 begins to "breathe", which means that the valve opens and closes at short intervals to regulate the flow of the refrigerant to the evaporator. When the valve is closed during the "breathing" action, the valve spring 17 holds the valve stem 15 against the replaceable valve seat 14. Under the closed condition of the valve, the pressure of the refrigerant in the evaporator decreases, resulting from the pumping of the compressor unit. This also decreases the pressure against the inside of the bellows or flexible wall means 28. When this pressure is decreased sufficiently, the valve spring 17 is overbalanced and the valve opens. This opening results from the fact that the pressure against the inside of the bellows or flexible wall means 28 plus the upward pressure of the spring 58 plus the upward pressure of the spring 17 is less than the downward pressure of the bellows or flexible wall means 56, plus the downward pressure of the internal spring 59. This over-balancing action forces the valve stem 15 downwardly and opens the expansion valve to admit liquid refrigerant to the evaporator. The liquid refrigerant, upon entering the evaporator expands and causes an increase in the pressure against the inside of the bellows or flexible wall means 28 and closes the valve. The "breathing" action of the valve opening and closing occurs in rather rapid succession and causes the pressure of the refrigerant delivered to the evaporator to remain substantially constant or stabilized during the operation of the valve.

The stabilized pressure at which the refrigerant enters the evaporator may be varied by turning the threaded sleeve 64, which varies the spring pressure of the internal spring 59 that is mounted within the flexible wall means or bellows 56. In other words, the stabilizing pressure of the refrigerant entering the evaporator may be adjusted to accommodate any size of evaporator by turning the threaded sleeve 64. In ordinary practice, if the evaporator is made up of a long series of pipes, it is necessary that the stabilizing pressure be higher than it would be if the evaporator is constructed of a shorter series of pipes.

In order to prevent the ice from running back upon the suction side of the evaporator, there is placed a control bulb 67 adjacent the suction pipe 157. Consequently, when the ice formation reaches the control bulb 67, the fluid contained therein becomes chilled with the result that the pressure is reduced. The reduction in the pressure of the control bulb 67 correspondingly reduces the pressure within the flexible wall means or bellows 56 that is mounted within the external actuating means 11. This reduction in pressure causes the valve spring 17 to overbalance the force produced by the spring 59 minus the spring 58 and to close the expansion valve 26 to stop the flow of the refrigerant to the evaporator. This in turn causes the ice, which is adjacent to the control bulb 67, to melt, after which the pressure in the flexible wall means or bellows increases to overcome the valve spring 17, to open the expansion valve 26, and allow the refrigerant to flow to the evaporator. This action is continued throughout the operation of our control device and keeps the ice from running back along the suction pipe 157. At this point, it is noted that the turning of the threaded sleeve 64 has no effect upon the functioning of the control bulb 67 and the flexible wall means or bellows 56. This is because the pressure within the control bulb 67 and the flexible wall means or bellows 56 is independent of the volume, but is a function directly of the temperature. Therefore, the adjustable threaded sleeve 64 may be adjusted to vary the stabilizing pressure at which the refrigerant enters the evaporator without influencing the operation of the control bulb 67 which prevents the ice from running back upon the suction side of the evaporator.

Therefore, it is noted that the operation of our control device, when the external actuating means is in its lowermost position, is substantially the same as that of the expansion valves now in existing installations. However, the up and down movement of the toggle assembly superimposes a new function upon the existing expansion valves. This new function makes the expansion valve responsive to the general temperature conditions resulting from the cooling action of the evaporator. This superimposing function of our control device may be explained as follows:

In the operation of a "dry expansion" evaporator, the pressure of the refrigerant is not a measure of the temperature. This is because the pressure of the vapor refrigerant, when the expansion valve is "breathing", is substantially constant. This is the reason why we utilize a thermo-expansible fluid pressure control means in the form of a control bulb 120 that is placed adjacent to, or in the region of, the evaporator. It is to be pointed out that while the control bulb or thermo-expansible tube 120 is mounted adjacent the fins of the evaporator, yet it is influenced by the temperature of the circulating air within the refrigerator 155, as well as by the skin temperature of the fins. In the operation of a "dry expansion" evaporator, there is a tendency for the ice or frost to collect upon the fins and if the frost or the ice is allowed to continue to collect, there would be formed a complete closure, or block of ice around the fins. When this condition happens, the effective area of the cooling surface of the "dry expansion" evaporator is materially reduced, because the circulating air can no longer contact the available space between the fins. Accordingly, it is necessary to control the flow of the refrigerant to the "dry expansion" evaporator, such that the refrigerant is shut off when too much ice begins to collect on the fins. The refrigerant is kept off until the ice has substantially melted from the fins. This cycle of operation may be referred to as a defrosting cycle.

In the case of a "dry expansion" evaporator, the adjustment of the large spring A is such that the pressure within the control bulb or thermoexpansible tube 120 is sufficient to overcome the large adjusting spring A when the skin temperature of the fins is approximately 33 degrees, just above the melting point of ice. This means that when the skin temperature of the fins reaches approximately 33 degrees, the toggle arrangement operates to move the external actuating means 11 downwardly in its lowermost position with reference to the expansion valve assembly 10. Under this condition, as explained before, the expansion valve begins to "breath" and deliver refrigerant to the evaporator. For commercial purposes, in order to give the proper refrigeration to the cooling of a refrigerator box, the lower temperature, at which the expansion valve is closed to stop the refrigerant from flowing to the evaporator, may be approximately 16 degrees skin temperature of the fins. The setting to give the 16 degrees skin temperature is determined by the setting of the small adjustment spring B. It is noted that just as soon as the ice begins to cover the control bulb 120, the circulating air of the refrigerator box 155, which is of a higher temperature than the skin temperature of the fins, is isolated from the control bulb 120 itself. Thus, under this condition, the toggle arrangement operates to close and lift the external actuating means to its uppermost position under which condition the valve spring 17 closes the expansion valve 26 and stops the flow of the refrigerant at a slightly higher value than 16 degrees skin temperature. This means that just as soon as too much ice begins to form upon the fins, the tendency for the expansion valve to close is slightly earlier than it normally would be in the absence of too much ice. Consequently, the valve closes earlier and is on the safe side. When the external actuating means is in its uppermost position, the plunger 57 is moved upwardly and allows the valve spring 17 to close the expansion valve 26 and shut off the flow of the refrigerant to the evaporator. The upper movement of the external actuating means is sufficient so that even though the lower end of the flexible wall means or bellows 56 is engaging the bottom of the casing 54, the lower end of the plunger 57 is clearing a flexible wall means 28. Consequently, the action of the plunger 57 and the external actuating means 11 is totally removed from influencing the expansion valve assembly 10 and under which condition the expansion valve 26 is closed.

Under the foregoing assumption, it is noted that the defrosting cycle operates between the upper temperature limit of 33 degrees skin temperature and a lower temperature limit of 16 degrees skin temperature. However, it is to be understood that the range of temperatures which I have assumed is merely arbitrary and may vary for different servicing conditions as well as with the kind of refrigerants used. In fact, the control device is capable of maintaining a temperature bracket or defrosting cycle upon a differential as little as 4 degrees. The turning of the adjustment screw 142 to increase the spring pressure of the small adjusting spring B lowers the cut-out temperature of the defrosting cycle. The turning of the adjustment nut 130, to increase the spring pressure of the large adjusting spring A, raises the cut-in temperature of the defrosting cycle for "dry expansion" evaporators. The position of the stop portion 125 is such that the adjustment nut 130 cannot be turned upwardly to decrease the spring pressure of the large adjustment spring A beyond the temperature point of 33 degrees skin temperature. Therefore, it is noted that the superimposing action of the toggle arrangement which moves the external actuating means 11 with reference to the expansion valve assembly 10 is such as to control the flow of the refrigerant to the evaporator in response to the general temperature conditions resulting from the cooling action of the evaporator. It is to be understood that the general temperature conditions resulting from the cooling action of the evaporator may include the temperature of the atmosphere surrounding the evaporator, as well as the temperature of the evaporator itself, or in the case of a liquid cooler, it may include the temperature of the liquid medium as well as the temperature of the evaporator itself.

While we have illustrated a spring toggle arrangement actuated by a control bulb for actuating the external actuating means 11 up and down relative to the expansion valve assembly 10, it is to be understood that any suitable means may be employed. To this end, as illustrated in Figure 7, we show that the external actuating means may be moved up and down by means of a solenoid 159 energized from the supply conductors 161 and 162 through means of a thermoswitch 163 influenced by a control bulb 164 mounted beneath the evaporator 156. The energizing of the solenoid 159 magnetically forces the plunger 160 and the control levers 158 downwardly and moves the external actuating means to its lowermost position relative to the expansion valve assembly 10. When the solenoid is deenergized a spring 165 lifts the levers 158 and moves the external actuating means 11 to its uppermost position with reference to the expansion valve assembly 10. The operation of our modified form as shown in Figure 7 is substantially the same as that previously described with reference to the toggle arrangement, in that the solenoid moves the external actuating means 11 relative to the expansion valve assembly 10 for controlling the flow of the refrigerant to the evaporator in response to the general temperature conditions resulting from the cooling action of the evaporator.

In Figure 8, we show a second modified form in that the solenoid 159 is energized by the supply conductors 168 and 169 through means of a controlled relay 167 that is operated by a thermostat 166 having two current carrying contacts 170 and 171. The thermostat 166 may be placed either adjacent to the evaporator or it may be placed in the chamber which is being cooled. For instance, in the case of a cold storage room, the thermostat may be placed in the region of the circulating air some distance from the evaporator itself, or it may be placed adjacent to, or near, the evaporator as conditions may dictate. Also the control bulb 120 in the case of the toggle arrangement and the control bulb 164 in the case of the solenoid arrangement may be placed in the region of the air currents some distance away from the evaporator as well as being placed adjacent to, or near, the evaporator. Therefore, the expression in response to the general temperature conditions resulting from the cooling action of the evaporator covers any condition that is effected by the general cooling action of the evaporator. Consequently, our control device may be utilized for air conditioning purposes as well as for refrigerating purposes.

Although we have described our invention with a certain degree of particularity, it is understood that the present disclosure has been made only by way of example and that numerous changes in the details of construction and the combination and arrangement of parts may be resorted to without departing from the spirit and scope of the invention as hereinafter claimed.

We claim as our invention:

1. A device for controlling the flow of refrigerant to an evaporator having an entrance side and an exit side, comprising, in combination, a valve for controlling the flow of the refrigerant to the entrance side of the evaporator, means for adjustably setting the valve to adjust the pressure of the refrigerant entering the entrance side of the evaporator, second means for governing the valve in response to the variation of the temperature at a given portion of the exit side of the evaporator to limit the frosting of the exit side of the evaporator in the direction of the flow of the refrigerant, and third means for also controlling the valve to admit of an operating cycle of the flow of the refrigerant through the evaporator, in response to the variation of the temperature at a given portion intermediate the entrance and the exit side of the evaporator.

2. A device for controlling the flow of refrigerant in an evaporator having an entrance and an exit side comprising, in combination, a valve connected in communication with the evaporator for controlling the flow of refrigerant, first means for governing the valve in response to the variation of the temperature at a given portion of the exit side of the evaporator to limit the frosting of the exit side of the evaporator in the direction of the flow of the refrigerant, and second means for also controlling the valve to admit of an operating cycle of the flow of the refrigerant through the evaporator, in response to the variation of the temperature at a given portion intermediate the entrance and the exit side of the evaporator.

3. A device for controlling the flow of refrigerant to an evaporator having an entrance side and an exit side, comprising, in combination, a valve for controlling the flow of the refrigerant to the entrance side of the evaporator, means for adjustably setting the valve to adjust the pressure of the refrigerant entering the entrance side of the evaporator, a temperature responsive device adapted to be influenced by the variations of the temperature at a given portion of the exit side of the evaporator, means responsive to said temperature responsive device for governing the operation of the valve to limit the frosting of the exit side of the evaporator in the direction of the flow of the refrigerant, a second temperature responsive device adapted to be influenced by the variation of the temperature at a given portion intermediate the entrance and the exit side of the evaporator, a toggle arrangement adapted to control the operation of the valve to admit of an operating cycle of the flow of the refrigerant in the evaporator, and means responsive to said second temperature responsive device for controlling the toggle arrangement and the valve to govern the operating cycle.

4. A refrigeration control device comprising, in combination, a valve having a movable part, means for urging the said movable part of the valve in one direction to close the valve, external actuating means for urging the said movable part of the valve in the opposite direction to open the valve, a flexible wall means interposed between the valve and the external actuating means, said external actuating means including a resilient member and a second flexible wall means to urge the said movable part of the valve in the opposite direction to open the valve, and means for moving the external actuating means bodily away from the first-mentioned flexible wall means to alter the operation of the said valve.

5. A refrigeration control device comprising, in combination, a valve casing, a valve mounted in the casing, means disposed on one side of the valve to influence the operation of the valve, a flexible wall means for sealing the valve in the casing, temperature responsive means disposed on the opposite side of the valve and externally of the flexible wall means to influence the operation of the valve through the flexible wall means, and means for altering the influence that the temperature responsive means has upon the operation of the valve.

6. A refrigeration control device, comprising, in combination, a valve casing, a valve mounted in the casing, means disposed on one side of the valve to influence the operation of the valve, flexible wall means for sealing the valve in the casing, temperature responsive means disposed on the opposite side of the valve and externally of the flexible wall means to influence the operation of the valve through the flexible wall means, and means including a toggle arrangement for altering the influence that the temperature responsive means has upon the operation of the valve.

7. A refrigeration control device, comprising, in combination, a valve casing, a valve mounted in the casing, means disposed on one side of the valve to influence the operation of the valve, flexible wall means for sealing the valve in the casing, temperature responsive means disposed on the opposite side of the valve and externally of the flexible wall means to influence the operation of the valve through the flexible wall means, and means including a toggle arrangement for moving the temperature responsive means relative to the valve for altering the influence that the second means has upon the operation of the valve.

8. A refrigeration control device comprising, in combination, a valve having a movable part, means for urging the said movable part of the valve in one direction to close the valve, actuating means including a resilient member and a flexible wall means for urging the said movable part of the valve in the opposite direction to open the valve, and means for moving the actuating means bodily away from the movable part of the valve to alter the operation of the said valve.

9. A refrigeration control device, comprising, in combination, movable control means, resilient means for urging the movable control means in one direction, flexible wall means for urging the movable control means in the opposite direction, thermostatic bulb means connected in communication with the flexible wall means and arranged to govern the operation of same, second flexible wall means to alter the influence that the first flexible wall means has upon the operation of the movable control means, and second thermostatic bulb means connected in communication with the second flexible wall means and arranged to govern the operation of same.

10. In a refrigerating system having an evaporator, in combination, valve means connected in communication with the evaporator for controlling the flow of the refrigerant, resilient means for urging the valve means in one direction to influence the operation of the valve means, flexible wall means for urging the valve means in the opposite direction to open the valve means, thermostatic bulb means connected in communication with the flexible wall means and influenced by the variation of temperature at a given portion of the exit side of the evaporator to limit the frosting of the exit side of the evaporator in the direction of the flow of the refrigerant, and fluid pressure means to alter the influence that the flexible wall means has upon the operation of the valve means.

11. In a refrigerating system having an evaporator arranged for inclusion in a closed refrigerant circuit, in combination, valve means connected in communication with the evaporator for controlling the flow of the refrigerant, resilient means for urging the valve means in one direction to influence the operation of the valve means, and means including two pressure responsive means for influencing the operation of the valve means, each of the said two pressure responsive means being affected by the closed circuit at two spaced locations, one of said responsive means being arranged to limit the frosting of the exit side of the evaporator in the direction of the flow of the refrigerant and the other responsive means being arranged to alter the influence that the first responsive means has upon the operation of the valve.

12. The method of admitting a refrigerant to an evaporator which comprises causing the expansion valve of the "breathing" type and also of the type limiting the frosting of the exit side of the evaporator to open and close in accordance with a de-frosting cycle governed by the variation of the temperature at a given portion intermediate the exit and entrance sides of the evaporator.

13. A device for controlling the flow of refrigerant to an evaporator having an entrance side and an exit side, comprising, in combination, a valve for controlling the flow of the refrigerant to the entrance side of the evaporator, means for adjustably setting the valve to adjust the pressure of the refrigerant entering the entrance side of the evaporator, second means for governing the valve in response to the variation of the temperature at a given portion of the exit side of the evaporator to limit the frosting of the exit side of the evaporator in the direction of the flow of the refrigerant, and third means including snap-action means adapted to quickly open and quickly close said valve for also controlling the valve to admit of an operating cycle of the flow of the refrigerant through the evaporator, in response to the variation of the temperature at a given portion intermediate the entrance and the exit side of the evaporator.

14. A device for controlling the flow of refrigerant in an evaporator having an entrance and an exit side comprising, in combination, a valve casing, a valve mounted in the casing, means disposed on one side of the valve to influence the operation of the valve, a flexible wall means for sealing the valve in the casing, temperature responsive means disposed on the opposite side of the valve and externally of the flexible wall means for controlling the valve to admit of an operating cycle of the flow of the refrigerant in the evaporator in response to the variation of the temperature at a given portion intermediate the entrance and exit side of the evaporator, and means to regulate the upper temperature at which the operating cycle of the flow of the refrigerant in the evaporator is initiated and the lower temperature at which the operating cycle is arrested.

RUFUS E. STOLZ.
GEORGE V. WOODLING.